United States Patent [19]
Dick

[11] 4,159,887
[45] Jul. 3, 1979

[54] LOAD CAP

[75] Inventor: Lloyd C. Dick, Cincinnati, Ohio

[73] Assignee: The Mead Corporation, Dayton, Ohio

[21] Appl. No.: 838,823

[22] Filed: Oct. 3, 1977

[51] Int. Cl.² .......... B65G 61/00
[52] U.S. Cl. .......... 414/786; 93/93 D; 414/114; 414/608
[58] Field of Search .......... 214/621, 10.5 R, 8.5 SS; 93/93 D

[56] References Cited

U.S. PATENT DOCUMENTS

| | | | |
|---|---|---|---|
| 3,260,033 | 7/1966 | Shaw et al. | 93/93 D |
| 3,850,116 | 11/1974 | Mackes | 214/10.5 R |
| 3,964,618 | 6/1976 | Dreyer | 214/10.5 R |
| 4,042,127 | 8/1977 | Brossia | 214/10.5 R |

*Primary Examiner*—Robert G. Sheridan
*Assistant Examiner*—Ross Weaver
*Attorney, Agent, or Firm*—Charles N. Shane, Jr.; Stephen H. Cagle

[57] ABSTRACT

A load cap for use in combination with a lifting skid pallet to permit decking and undecking of unitized sheeted material. The load cap is suitable for use in cooperating relationship with a push-pull attachment found on forklift apparatus. The load cap comprises a planar main body portion, the main body portion having a plurality of linear edges, at least two of the linear edges being substantially parallel to each other. The load cap further comprises a pair of scored side flaps attached to opposite parallel edges of the main body portion, a portion of each of the side flaps is adaptable to be inserted between abutting sheets of the sheeted material. The load cap further comprises a front flap, the front flap being attached to the frontmost edge of the main body portion, the front flap being partially arcuately rotatable about the axis as defined by the intersection of the front flaps with the main body portion. The front flap can be used in cooperating relationship with the platen of forklift apparatus to maintain a stationary pressure on a portion of the sheeted material when the front flap is aligned in a plane perpendicular to the plane defined by the main body portion.

1 Claim, 6 Drawing Figures

FIG-1
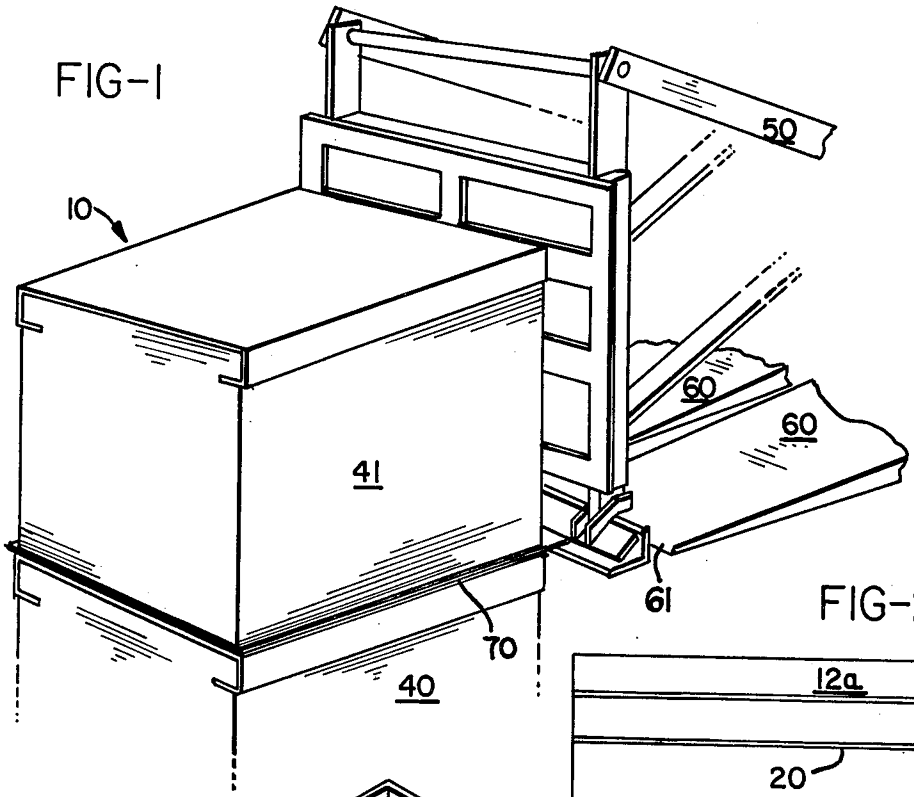
FIG-2
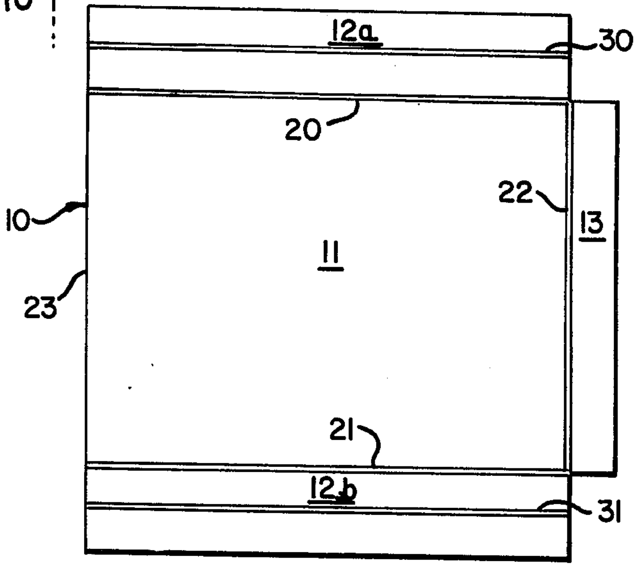
FIG-3
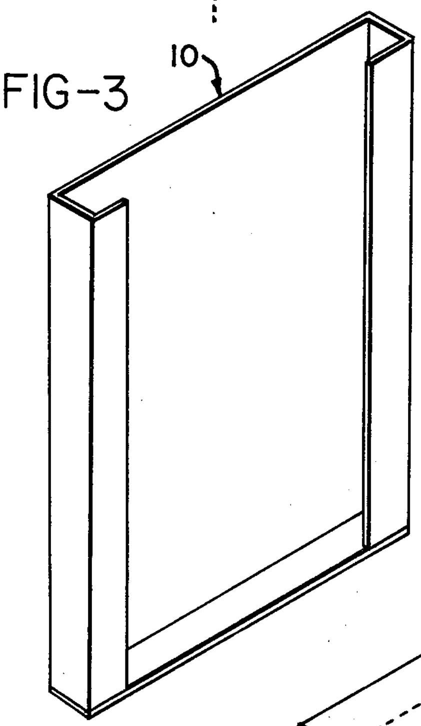
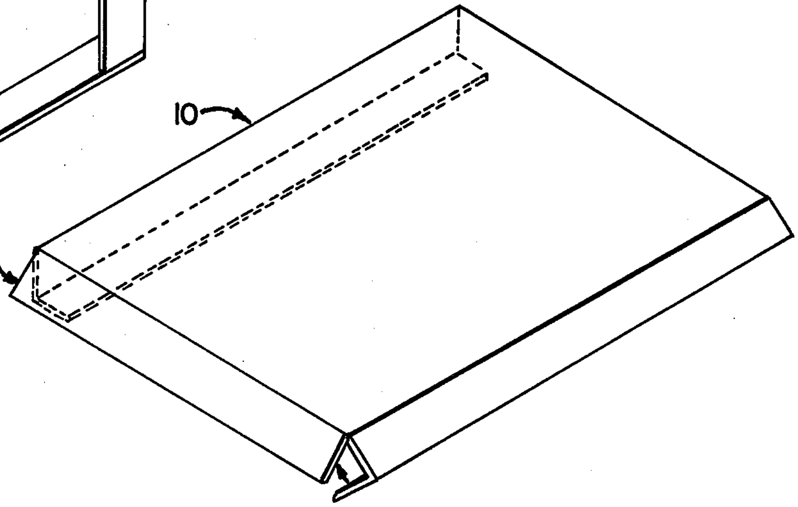
FIG-4

LOAD CAP

BACKGROUND OF THE INVENTION

1. Field of the Invention

This invention relates generally to load caps for use in combination with materials handling pallets and specifically to a load cap adapted for use with push-pull attachments found on forklift trucks and the like.

2. Prior Art

It is common in the warehousing, storage and shipping of goods and especially sheeted goods to palletize those materials not only for convenience in moving, but also for protection of the contents from water damage and the like. In most instances the pallets of the prior art are made from parallel, spaced wooden planks fixedly attached to wooden support members. It is a common problem, however, that wooden pallets are very expensive and easily damaged by the excessive use and weight which is placed thereon. Moreover, wooden pallets have been known to actually cause considerable damage to products if the pallets are not used properly or if the pallet is in poor repair. This is especially true when products are palletized and stacked or decked. This problem is further emphasized when there is a substantial amount of overhang of the stacked product over the outside dimension of the particular pallet. The pallets when stacked or decked to a substantial height, as is common, have a tendency to damage the palletized goods contained on the lowermost pallets. As a result of this a need has arisen for a load cap which can be used in conjunction with conventional wooden pallets but which also is at least effective if not more effective for its intended use when used with what is sometime referred to as a "slip sheet" and which is alternatively referred to herein as a "lifting skid pallet".

An early patent dealing with this general subject matter is U.S. Pat. No. 2,530,444 (1950) to Woods which is directed to a method and apparatus for loading freight cars. In the Woods patent the materials disclosed are merely directive to spacing material for preventing goods loaded onto a box car from damaging one another during transit. U.S. Pat. No. 2,534,011 (1950) to Frye deals with a reusable pallet bin which is used only in conjunction with banded materials. U.S. Pat. No. 2,594,287 (1952) to Budd is directed to a pallet container assembly for shipping articles and is primarily directed to cardboard members which can be banded on the top and bottom of articles to prevent damage thereto. Finally, U.S. Pat. No. 3,934,805 (1976) to Elaschuk discloses an appliance base which is used to protect the bottom of appliances such as refrigerators from damage during transit.

Conventionally, expensive wood, metal or plastic pallets are utilized whenever loads of loose (unbanded) sheets are to be transported or warehoused as an internal operation with any carton converting or similar operation. These units are sometimes referred to as "inprocess loads". Considerable damage occurs to these inprocess loads caused by overhang of sheets on undersized pallets, broken deck boards, protruding pallet nails, pressure of bottom tie boards on pallet runners from tiered loads making impressions in top sheets of bottom loads, etc. All such damage can be eliminated by changing from these inprocess pallets to slip sheets. However, the load cap must be used, in conjunction with slip sheets, to permit undecking of the unbanded slip sheeted unitized loads. Without a load cap, top sheets on the bottom load will be pulled off and/or damaged during the undecking operation.

From this it can be understood that there has been a long felt need for a load cap for use in combination with wooden pallets and lifting skid pallets which is simple to use, inexpensive to manufacture and at the same time which is operationally effective. These goals are normally very difficult to obtain and are not obtainable by the mere insertion of a support structure in between decked materials. These goals have been obtained by the invention contained herein.

SUMMARY OF THE INVENTION

A load cap for use in combination with a lifting skid pallet to permit decking and undecking of unitized sheeted material. The load cap is suitable for use in cooperating relationship with a push-pull attachment found on forklift apparatus. The load cap comprises a planar main body portion, the main body portion having a plurality of linear edges, at least two of the linear edges being substantially parallel to each other. The load cap further comprises a pair of scored side flaps attached to opposite parallel edges of the main body portion, a portion of each of the side flaps is adaptable to be inserted between abutting sheets of the sheeted material. The load cap further comprises a front flap, the front flap being attached to the frontmost edge of the main body portion, the front flap being partially arcuately rotatable about the axis as defined by the intersection of the front flaps with the main body portion. The front flap can be used in cooperating relationship with the platen of forklift apparatus to maintain a stationary pressure on a portion of the sheeted material when the front flap is aligned in a plane perpendicular to the plane defined by the main body portion.

BRIEF DESCRIPTION OF THE DRAWINGS

FIG. 1 is a perspective view showing the load cap of this invention applied to a unitized sheeted load, the load cap being shown as it is used in conjunction with a push-pull attachment. Load caps are shown positioned on top of both the first and second tiers and unitized loads.

FIG. 2 is a top view of the load cap of this invention.

FIG. 3 is a perspective view showing the method of folding the load cap of this invention.

FIG. 4 is a perspective view of the load cap of this invention taken from the bottom and showing the flaps in their folded or tucked position.

DESCRIPTION OF THE PREFERRED EMBODIMENT

Figure 5:
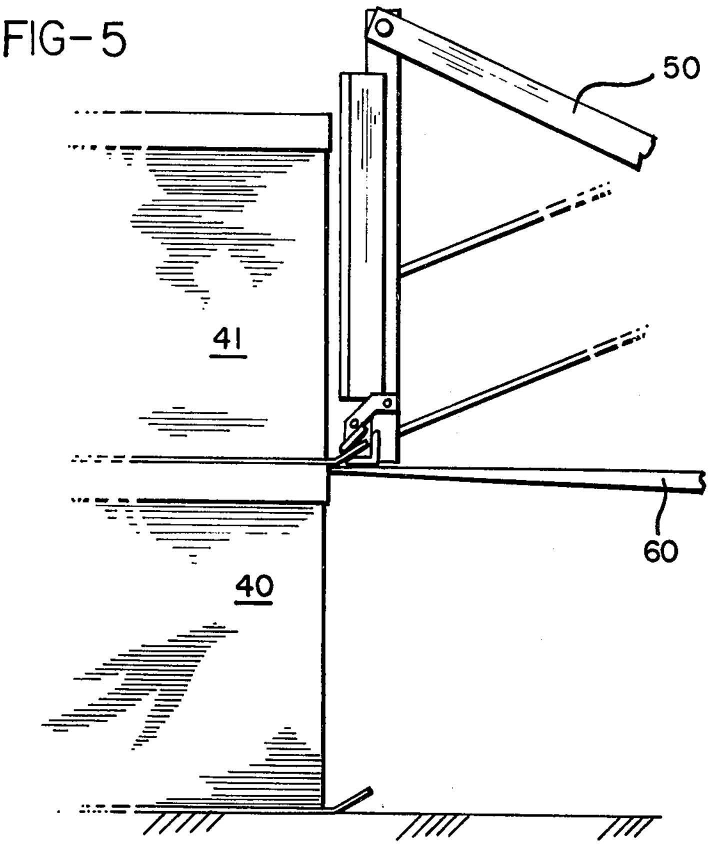
FIG. 5 is a side view of tiered, unitized loads of sheeted material wherein the load cap of this invention is in place on both the bottom and top tiered load. The platen and push-pull attachment of the fork lift apparatus are in place to withdraw the top load.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principals of the invention as illustrated therein being contemplated as would normally occur to one skilled in the art to which the invention relates.

Referring now specifically to FIG. 2 the numeral 10 designates a load cap of laminar construction made from laminated plies of what is commonly referred to as cylinder board. Cylinder board is generally made from secondary fibers such as recycled paper, boxes and the like. In manufacturing the cylinder board various plies of the cylinder board can be combined on laminating apparatus to form a sheet of material having the desired strength and rigidity characteristics. For purposes of this application the overall thickness or caliper of the particular load cap being constructed generally ranges of from about 0.04 inches to about 0.15 inches in overall thickness. A preferred thickness is from about 0.05 inches to about 0.10 inches while a most preferred thickness is from about 0.06 inches to about 0.095 inches. Other important characteristics are tensile strength and density to be described hereinafter. However, the invention is not limited to any particular fibrous sheet material, or in fact one which is laminated, but the sheet material useful in the product of this invention could generally be described as substantially rigid and stiff so as to be self-sustaining although flexible enough to be bent for purposes hereinafter described.

As mentioned above, the preferred material for the construction of the load cap of this invention is cylinder board. Cylinder board can generally be described as a material which is relatively stiff and rigid and which can be conveniently laminated into a plurality of layers to a more substantial structure. As has been developed supra one characteristic of the cylinder board is a thickness of from about 0.04 inches to about 0.15 inches. This thickness is obtained by laminating together one or more plies of cylinder board with an adhesive, pressure or both.

Other cylinder board characteristics which have been shown to be important would include: basis weight, density, mullen, Tinius-Olsen stiffness, and tensile strength. While each of these characteristics will be described hereinafter it should be noted that in designing any particular load cap for a specific use any or all of these characteristics may be critical although likewise none of these particular characteristics may be required. Therefore, the following represent general guidelines for the manufacture of most load caps and not absolute characteristic ranges.

The basis weight refers to the weight in pounds per unit area of the particular material used to make the product. In general a basis weight of from about 140 pounds per 1000 $ft.^2$ to about 420 pounds per 1000 $ft.^2$ is used although in the preferred embodiments of this invention a basis weight of from about 172 pounds per 1000 $ft.^2$ to about 371 pounds per 1000 $ft.^2$ is used. Also relating to the actual physical makeup of the cylinder board is density which generally ranges from about 3.50 pounds/1000 $ft.^2$/mil to about 4.50 pounds/1000 $ft.^2$ mil. In the preferred embodiments of this invention the density would be from about 3.65 pounds/1000 $ft.^2$/mil to about 4.10 pounds/1000 $ft.^2$/mil.

The mullen rating of cylinder board is a measure of the bursting strength of the particular material and is measured in pounds per square inches (psi). In general a mullen rating of from about 250 psi to about 700 psi is satisfactory although in some wet applications a somewhat higher rating is usually desirable. A preferred mullen rating range is from about 275 psi to about 650 psi.

The stiffness of the cylinder board material is measured by what is known as the Tinius-Olsen (T.O.) test, which is an officially recognized TAPPI testing procedure. The T.O. stiffness is measured separately for both the ross-grain and with-grain directions. Cross-grain ratings would range from about 0.10 for unreinforced material to about 1.50 for reinforced portions. The with-grain T.O. ratings are from about 0.50 for unreinforced portions to about 4.50 for reinforced portions.

The most important characteristic of the cylinder board or other base material is tensile strength. Tensile strength is also measured in both the cross-grain and with-grain directions. In general a cross-grain tensile strength rating of from about 75 pounds per inch to about 300 pounds per inch has been shown to be satisfactory for most applications. A with-grain tensile strength rating of from about 350 pounds per inch to about 700 pounds per inch is likewise satisfactory. Tensile strength is especially important in this invention as it relates directly to the ability of the particular slip sheet to withstand repeated action from push-pull attachments for lifting apparatus.

As can be seen more particularly in FIGS. 2 through 4 the load cap 10 of this invention consists essentially of a main body portion 11, side flaps 12A and 12B and front flap 13. Flaps 12A, 12B and 13 are attached to main body portion 11 along linear edges 20, 21 and 22 respectively. In the preferred embodiment of this invention edge 23 has no flap attached thereto although this is merely one embodiment and other embodiments may have a flap or other protective device attached at edge 23.

Side flaps 12A and 12B are scored along lines 30 and 31 respectively to permit bending and folding for insertion in between abutting sheets of stacked material as is shown more particularly in FIG. 1.

As can be more particularly seen in FIG. 2 a preferred shape of load cap 10 is rectangular with main body portion 11 having parallel long dimensioned edges 20 and 21 together with parallel short dimensioned edges 22 and 23. In one preferred embodiment of this invention for use during "on the road" shipment, edges 22 and 23 are approximately 42 to 44 inches in total width which will permit a conventional tractor trailer to accommodate two 40 inch wide loads and the edges 20 and 21 are approximately 50 to 52 inches in total width to permit a freight car to accommodate two 40 inch wide loads. These are preferred sizes for "on the road" shipments however and may be varied to any dimension desired depending on the size and configuration of the load to be stored and decked in the particular transporation means to be employed. In a second preferred embodiment of this invention for use during "in process" movement of unitized loads in the manufacturing facility itself edges 22 and 23 and edges 20 and 21 are approximately 60 inches to 70 inches in width to permit stacking of warehouse size "in process" loads.

In actual use the load cap of this invention is placed on the top of a palletized load 40 as is shown more specifically in FIG. 1. The load cap is aligned such that the side flaps 12A and 12B are on the side of the pelletized load and front flap 13 is on the side of the palletized load 40 facing the forklift apparatus designated by the number 50 in FIG. 1. The side flaps 12A and 12B are then bent in a downward direction along intersecting edges 20 and 21 and are then tucked between abutting sheets of the palletized load 40. Side flaps 12A and 12B are conveniently bent along scored lines 30 and 31 to provide the portion of the side flaps which is actually tucked into the load. Front flap 13 is arcuately rotatable along the axis as defined by edge 22 so that it may be pressed down to cover a portion of the palletized load 40.

After the load cap 10 has been applied to the palletized load 40 a second palletized load 41 may be placed on top thereof as is shown more particularly by FIG. 1. In this fashion stacked palletized goods may be stored, decked and undecked without damage to the materials being stored. It has also been known that steel or plastic bands can be used to keep palletized sheeted material in place. However these bands are not only expensive, difficult to apply but also cause substantial problems in their use during decking and undecking as they provide unwanted edges and surfaces for scratching or otherwise mutilating the load which is palletized. Therefore for purposes of this invention the load cap is considered as an alternative to banded products although it is possible to use the load cap in combination with bands.

It is important to stress herein the flat, planar condition of the stack of unbanded unitized material which is attainable with the use of slip sheets of the type herein described. This is a particular advantage not enjoyed by wooden pallets as with traditional wooden pallets stress sections are found at the point of material overlap and even at points of support in the wooden pallet itself. All of the undesirable characteristics coupled with the expense and general disrepair of wooden pallets has made slip sheets and load caps which are complimentary to slip sheets a viable commercial materials handling system.

Figure 6:
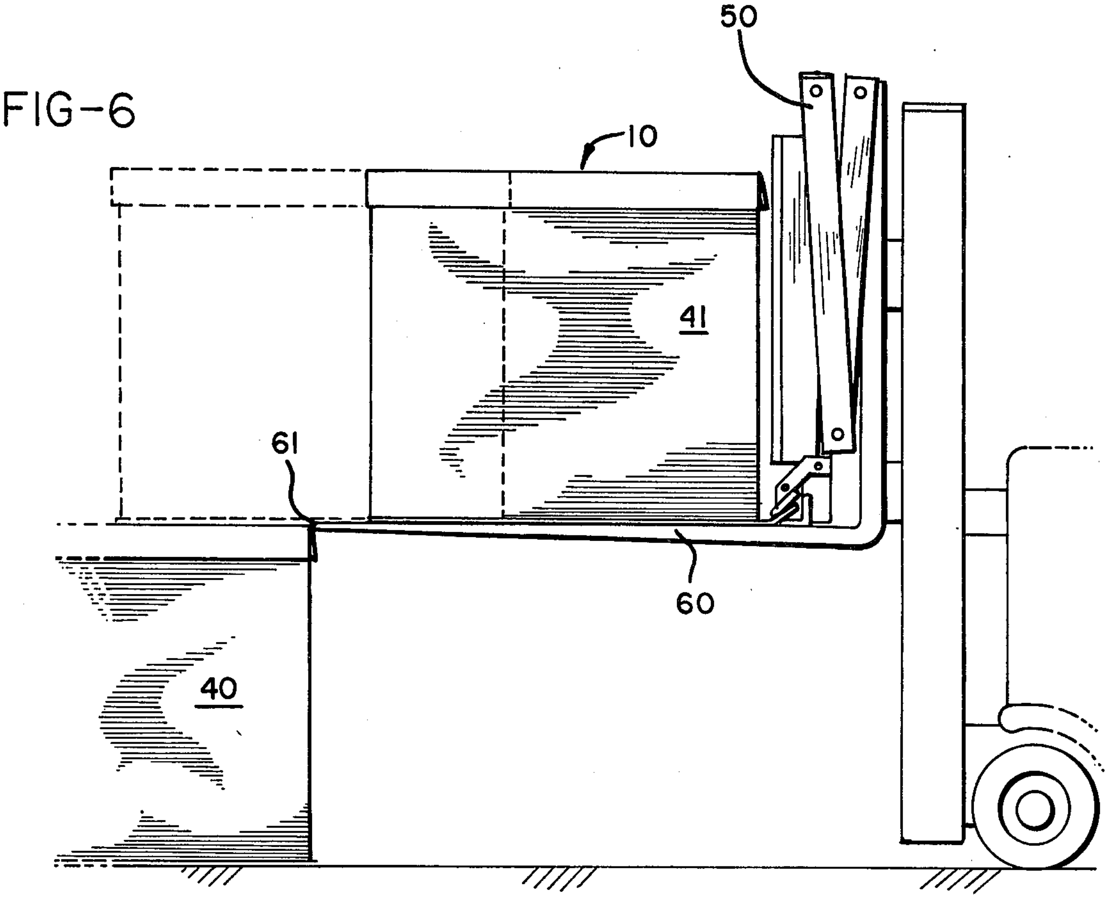
FIG. 6 is a side view similar to that shown in FIG. 5 with the exception that the topmost unitized load is shown in two positions as it is being pulled onto the platen.

This load cap is especially adapted for use with a lifting apparatus (see FIGS. 1, 5 and 6) which is provided with vertically extending platen 60 and a vertically moveable gate 61, within a guide frame 62, having a bar 63 that abuts against the top side of the particular slip sheet being used to hold the palletized load. Other types of lifting or forklift apparatus are, of course, useful with the product and process of this invention although those having platen such as illustrated by the numbers 60 are most preferred. The apparatus described hereinabove as the vertically moveable gate guide frame and bar are sometimes referred to in combination as the push-pull attachment for use with lifting apparatus. This action of grasping and withdrawing unitized loads with load caps in place is more fully illustrated by FIGS. 5 and 6.

As illustrated in FIGS. 1 through 4 flaps 12A, 12B and 13 work together in cooperating relationship with the platen 60 of lifting apparatus 50 to prevent the topmost sheets of the palletized load 40 from moving while the decked load 41 is being pulled onto or pushed off of the push-pull platen 60. In this regard the tips 61 of the platen 60 are pressed against flap 13 and held there with a constant tension. This pressure is continued while the push-pull attachment of the lifting apparatus 50 grasps the slip sheet 70 and withdraw the entire palletized load almost completely from its decked position. In doing so the pressure from platen 60 on front flap 13 together with a pressure downward caused by tucked flaps 12A and 12B keep the topmost sheeted material of stacked load 40 in place. It is possible to simply push or pull the entire stacked load 41 onto or off of the load cap as is shown by FIG. 1. However the preferred operating procedure would require that when the tiered or stacked load is within several inches of being pulled completely off the bottom load 40 the pantograph 62 is used to push the tiered load 41 approximately 2 to 3 inches back onto the bottom load while the truck and platen is backed away simultaneously. This releases the tension on flap 13. At this point the tiered load is raised, clearing the bottom load 40 completely and the undecking operation can then be completed. The bottom load 40, protected by the load cap 10, is left intact with spilling, disruption or damage to the topmost sheets.

While the invention has been illustrated and described in detail in the drawings and foregoing description the same is to be considered as illustrative and not restrictive in character, it being understood that only the preferred embodiment has been shown and described and that all changes and modifications that come within the spirit of this invention and the scope of the claims are also desired to be protected.

What is claimed is:

1. A method for undecking stacked, unitized sheeted material, a portion of the bottom stacked deck of said stacked sheeted material having a load cap inserted therein comprising:

(a) positioning the platen of conventional forklift apparatus in abutting relationship with the front flap of said load cap;

(b) gripping the lifting skid pallet on which the upper stacked deck of sheeted material is resting with gripping means attached to said forklift apparatus; and (c) pulling said lifting skid pallet on which the upper stacked deck of sheeted material is resting onto the platen of said forklift apparatus without removing said platen from their original abutting relationship with the front flap of said load cap, said load cap preventing movement of said sheeted material contained in said lower stacked portion.

* * * * *